United States Patent [19] | [11] Patent Number: 4,851,860
Mutoh | [45] Date of Patent: Jul. 25, 1989

[54] TONE REPRODUCIBLE INK JET PRINTER

[75] Inventor: Masayuki Mutoh, Machida, Japan

[73] Assignee: Minolta Camera Kabushiki Kaisha, Osaka, Japan

[21] Appl. No.: 29,977

[22] Filed: Mar. 25, 1987

[30] Foreign Application Priority Data

Mar. 27, 1986 [JP] Japan .................................. 61-69457

[51] Int. Cl.⁴ .............................................. G01D 15/18
[52] U.S. Cl. ....................................... 346/75; 358/298
[58] Field of Search ........................... 346/75; 358/298

[56] References Cited

U.S. PATENT DOCUMENTS

| | | | |
|---|---|---|---|
| 3,947,851 | 3/1976 | Chen et al. | 346/1.1 |
| 3,977,007 | 8/1976 | Berry et al. | 346/1.1 |
| 4,065,773 | 12/1977 | Berry | 346/75 |
| 4,673,951 | 6/1987 | Mutoh et al. | 346/75 |

FOREIGN PATENT DOCUMENTS

| | | | |
|---|---|---|---|
| 60-55309 | 12/1985 | Japan | 400/126 |

*Primary Examiner*—E. A. Goldberg
*Assistant Examiner*—Gerald E. Preston
*Attorney, Agent, or Firm*—Burns, Doane, Swecker & Mathis

[57] ABSTRACT

An ink jet printer in which a plurality of ink jet generators are moved in unison with one another and relative to a record medium for recording. Each of the ink jet generators comprises a nozzle for continuously ejecting an ink, a charge electrode for applying a pulse voltage to the ink to selectively charge droplets of the ejected ink, a deflector electrode for producing a deflection electric field for deflecting a row of charged droplets and permitting a row of uncharged droplets to proceed straight, an oscillation controller, an oscillator for oscillating the nozzle to control ink droplet formation in response to clock pulses output by the oscillation controller, a pulsewidth modulator for controlling a pulsewidth of the pulse voltage to be applied to the charge electrode according to a dot size to be recorded, a delay circuit for delaying the pulse voltage from the pulsewidth modulator, and a phase synchronizing circuit for outputting the pulse voltage of the delay circuit to the charge electrode in phase with the clock pulses output by the oscillation controller. This construction is capable of adjusting dot position displacement among the nozzles over a wide range without injuring control of the ink to a row of ink droplets, thereby to record images with high resolution and high tone reproduction.

5 Claims, 6 Drawing Sheets

TONE REPRODUCIBLE INK JET PRINTER

FIELD OF THE INVENTION

The present invention relates to a tone reproducible ink jet printer, and more particularly to an ink jet printer resorting to the on-off modulation technique which is one of the ink jet techniques proposed by Hertz.

BACKGROUND OF THE INVENTION

Hertz's ink jet techniques are disclosed in U.S. Pat. No. 3,416,153 and No. 3,916,421 and provide high resolution and high precision. The on-off modulation type ink jet technique will be described first to facilitate understanding of the present invention. FIG. 1A of the accompanying drawings is a schematic view of a record head used in a Hertz's ink jet printer of the on-off modulation type. The head comprises a nozzle 1 having an orifice diameter of 15 micrometers, for example, and a porous control electrode 2. The latter is divided into a grounded annular charge electrode 3, a deflection electrode 4 and a ground electrode 5 opposed to the electrode 4. A d.c. voltage Vd of 1.5 kV, for example, is impressed on the deflection electrode 4 to set up between the electrode 4 and the ground electrode 5 a deflection electric field intersecting the nozzle axis at right angles therewith.

An ink pressurized by a pump 6 to 3.9 Mpa (40 atm.), for example, is led to the nozzle 1 to be continuously ejected from the orifice as indicated by 7 at an initial velocity of about 50 m/sec. The ink is broken up in flight into a row of fine drops or droplets 8 about 25 micrometers in diameter. The drop formation frequency fd is about $10^6$ Hz, and the row of droplets is modulated by being charged with a rectangular wave charging pulse signal having a frequency fm of 50 kHz as shown in FIG. 1B.

While traveling through the deflection electrode, the row of charged droplets is dispersed in the form of a spray by electrostatic repulsion and viscous resistance of air, and is then deflected toward the ground electrode 5 and drawn off for removal. A row of uncharged droplets only proceeds straight toward record paper 10 wound around a rotary drum 9.

When the ink droplet row of drop formation frequency fd Hz is modulated at a frequency of fm Hz at a low level period tw, one pulse of the charging signal covers (fd·tw) number of ink droplets 8. This row of ink droplets forms one dot on the record paper. In the above example, $fd=10^6$ Hz and tw=20 microseconds, hence (fd·tw)=20. Thus, a row of about 20 ink droplets produces one dot.

In this case, the number of ink droplets producing one record dot is variable by changing the pulsewidth tw of the charging signal Vs shown in FIG. 1B. This enables tone reproduction to be effected in a multistep fashion.

The ink is charged by utilizing an electrostatic induction phenomenon occurring between the ink 7 an the grounded charge electrode 3. As shown in FIG. 2, when a positive charge voltage Vs is applied to the ink, the capacitor having the capacitance formed between the ink 7 and the charge electrode 3 is charged through the resistance Rj of the ink stream. The electric charge Qj on the ink in steady state is equal to Cj·Vs.

The ink is charged with a rectangular wave voltage which is quick to rise and fall to the greatest possible extent. However, since Rj and Cj provide an integration circuit equivalently, the ink is charged with the time constant CjRj. Thus, the ink is charged invariably at the time constant which is definite. Preferably the time constant is sufficiently smaller than the drop formation frequency (1/fd), but presently CjRj and 1/fd are at a comparable level. Therefore, unless the charging and droplet formation are effected in the same timing, charging-uncharging will not be effected in a binary mode but, as shown in FIG. 3, the ink droplets formed at the moment when the charge voltage rises or falls will be charged at an intermediate level to impair the image quality.

The drop formation frequency fd fluctuates above and below a mean value, i.e. a spontaneous drop formation frequency governed primarily by the properties of the ink, the nozzle orifice diameter and the flow rate of the ink. It has therefore been considered difficult to effect the charging and the droplet formation in the same timing.

Having regard to the above problem, the present applicants have proposed a technique of effecting the charging and the drop formation in the same timing, which is disclosed in U.S. Pat. application Ser. No. 780,821 filed Sept. 27, 1985. In the prior technique disclosed therein, the nozzle is equipped with an oscillator for forcibly oscillating the nozzle with a frequency approximately equal to the spontaneous drop formation frequency, thereby to stabilize the drop formation. Furthermore, the drop formation and charging are effected in the same timing by synchronizing the pulse output timing of a pulsewidth modulator for varying the number of ink droplets forming one dot with the oscillating timing of the oscillator.

According to the above technique, the drop formation is stabilized to a great extent, and the ink jet is controllable to a droplet since the charging and droplet formation are synchronized in phase. On the other hand, the proposed technique has the following drawback.

In the case of a color printer comprising four nozzles for four colors, i.e. cyan, magenta, yellow and black, it is necessary for ink droplets leaving the respective nozzles to reach a recording position in a perfectly superposing manner without causing dot deviation. For this purpose, the charging phase must be adjustable among the nozzles. In order to adjust the charging phase among the nozzles, a delay circuit as shown in FIG. 4 may be provided for each nozzle. As illustrated, the delay circuit comprises a pulse-width modulator 10, and a shift register 11 and a shift clock generator 12 disposed downstream of the pulsewidth modulator 10.

With the above delay circuit, however, the shift clock is generated in total independence of the nozzle oscillating phase, i.e. the drop formation phase, and therefore it is impossible to bring the charging and drop formation into phase. This is detrimental to the control of the ink jet to a droplet, which would nullify the meaning of the excellent technique proposed by the present applicant and disclosed in U.S. Pat. No. 4,673,951. The resulting image would have a highlight portion thereof printed with only a poor tone reproduction, and noise would be produced by improperly charged droplets.

Where only one nozzle is provided, the charging and drop formation may be brought into phase by changing the output of an oscillation signal generator into a suitable frequency by means of a divider for delivery to the pulsewidth modulator 10 as shown in FIG. 4. In this case the delay circuit is unnecessary. However, this method is unsuitable to an ink jet printer comprising a plurality of nozzles which forms the subject of the present invention, since such a printer employs means to adjust the phases among the nozzles thereby causing the charging to be out of phase.

SUMMARY OF THE INVENTION

Accordingly, a primary object of the present invention is to provide an ink jet printer comprising a plurality of nozzles, which has high resolution and a high degree of tone reproduction.

Another object of the present invention is to achieve high resolution and a high degree of tone reproduction in a Hertz's type ink jet printer by utilizing a technique of adjusting dot positions among a plurality of nozzles without injuring the tone reproduction.

A further object of the present invention is to provide means to adjust dot positions among a plurality of nozzles, which is well suited to a Hertz's type color ink jet printer.

In order to fulfill these and other objects, the present invention provides an ink jet printer in which a plurality of ink jet generators are moved in unison with one another and relative to a record medium for recording, each of the ink jet generators comprising an ejecting means for continuously ejecting an ink from a nozzle; a voltage applying means for applying a pulse voltage to the ink to selectively charge ink droplets; a means for producing a deflection electric field for deflecting a row of charged droplets and permitting a row of uncharged droplets to proceed straight; a means for generating reference clock pulses; a nozzle oscillating means for controlling ink droplet formation in response to the reference clock pulses; a pulsewidth controlling means for controlling a pulsewidth of the pulse voltage applied by the voltage applying means according to a dot size to be recorded; a delaying means for delaying a pulse output from the pulsewidth controlling means, the delaying means being capable of adjusting a delay time of each ink jet generator independently of the other ink jet generators; and a phase synchronizing means for outputting the pulse output of the delaying means in phase with the reference clock pulses.

More particularly, the phase synchronizing means includes a phase synchronizing circuit for substantially synchronizing a phase of the pulse voltage to be applied to the ink and the phase of the reference clock pulses, and a fine adjustment circuit for fine adjusting the two phases into agreement.

The above construction is capable of adjusting the phase of charging as desired for the respective nozzles by means of the delaying means, thereby to prevent dot position displacement among the nozzles. At the same time, the phase of charging and the phase of drop formation in each nozzle substantially are brought into agreement. Therefore, there is no possibility of improper charging, whereby excellent tone reproducibility is assured.

In combination with these advantages, the nozzle oscillating means provided for stabilizing the drop formation enables the ink jet to be controlled to a droplet. This permits the tone reproducibility of a highlight portion to be improved to the limit of the Hertz's ink jet printer.

BRIEF DESCRIPTION OF THE DRAWINGS

These and other objects or features of the present invention will become apparent from the following description of a preferred embodiment thereof taken in conjunction with the accompanying drawings, in which.

DESCRIPTION OF THE PREFERRED EMBODIMENT

Figure 5:
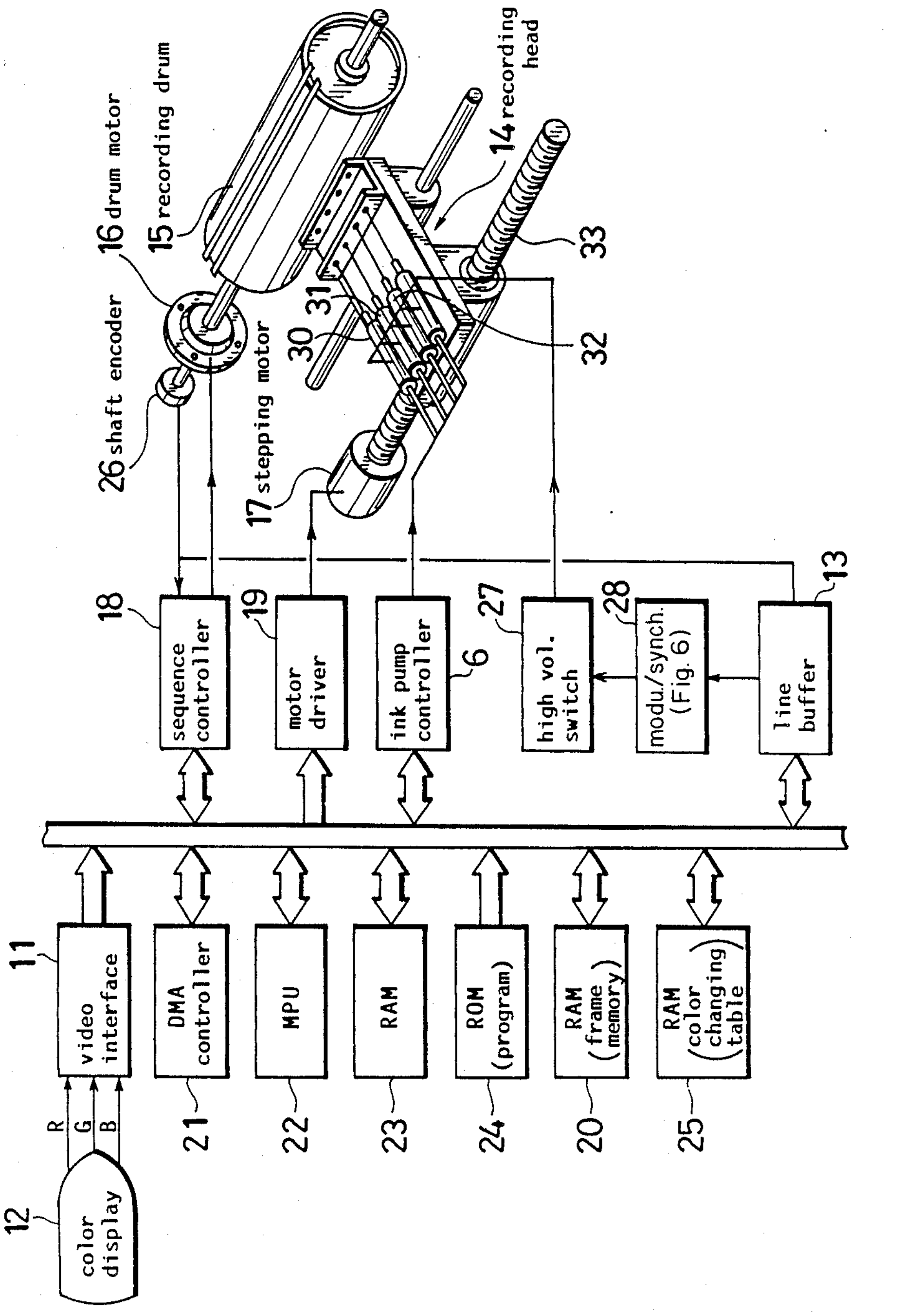
FIG. 5 is a view showing the construction of a video printer embodying the present invention.

FIG. 5 is a block diagram showing, as one embodiment of the present invention, an ink jet video printer for making hard copies of images on a color CRT display 12 connected to the printer via a video interface 11.

Figure 1A:
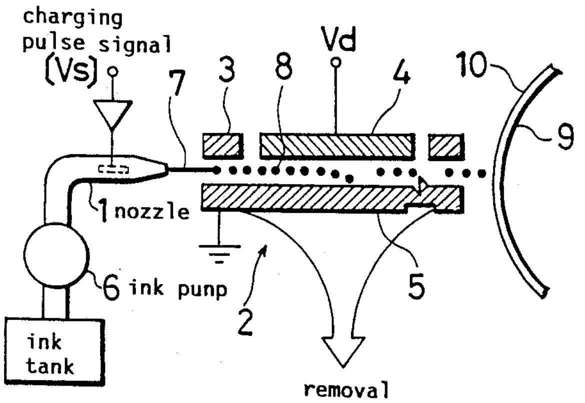
FIG. 1A is a schematic view of a record head for illustrating the recording principle of an ink jet printer of the on-off modulation type.
Figure 1B:
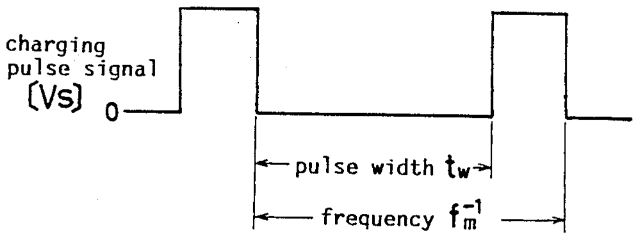
FIG. 1B is a diagram showing the waveform of charging pulse signal for modulating a row of ink droplets.
Figure 2:
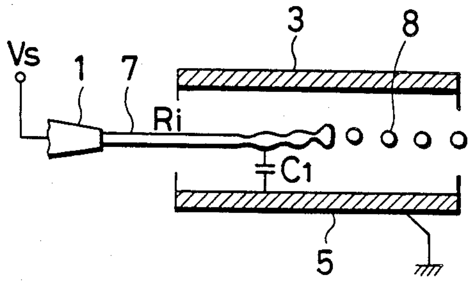
FIG. 2 is a schematic view in section of the record head for illustrating the reason for ink droplet charging.

This video printer is a rotary drum printer comprising a record head 14 having the nozzle 1 and the control electrode 2 described with reference to FIG. 1A, for each of four colors, cyan, magenta, yellow and black. No deflection electrode or deflection high voltage source is shown. A record medium is wound around a record drum 15 by an unillustrated feeder and is clamped. A drum motor 16 rotates the drum 15 for primary scanning, and the head 14 is intermittently moved by a stepping motor 17 axially of the drum for secondary scanning, whereby the record surface is scanned. Ink which is on-off modulated by image signals is impinged on the record medium to record an image. On completion of recording, the record medium is removed from the drum 15 by unillustrated discharge means. The drum motor 16 is controlled by a sequence controller 18. The stepping motor 17 is driven by a motor driver 19.

The R (red), G (green) and B (blue) signals, i.e. image signals, from the display 12 are subjected to A/D conversion by the video interface 11 and transferred to a frame memory 20 by DMA (direct memory access). The data transfer by DMA is controlled by a DMA controller 21. The R, G, B data written in the frame memory 20 is processed, as color-converted (R, G, B→C, M, Y, Bk) for each pixel, into dot patterns by a microprocessor 22 and a RAM 23 according to a source program stored in a ROM 24 and to a color conversion table provided in a RAM 25, followed by correction of nozzle position for each color. The patterns are then sent to a line buffer 13. Dot patterns for reproducing tones are prepared according to the color conversion table 25 simultaneously with the color conversion.

The line buffer 13 comprises two RAMs having a capacity corresponding to one horizontal line of the CRT 12 for each of the C, M, Y and Bk. The data processed as above and stored in the RAM is read out item by item in response to dot clock signals from a shaft encoder 26 coupled directly to the drum shaft. The data read out is delivered via a main circuit 28 according to the present invention to be described later and a high voltage switch 27, as charge signals by which the ink jets are modulated to record an image. The data writing by the microprocessor 22 and data reading responsive to the dot clock signals are done alternately by the two RAMs for each color.

The printer comprises four nozzles 30, 31, 32 and 33 arranged parallel axially of the drum for receiving the charge signals for C, M, Y and Bk, respectively. These signals are delayed by a predetermined time with respect to one another. The delay time is determined by the main circuit 28 such that the four ink jets do not produce dot position displacement.

Figure 6:
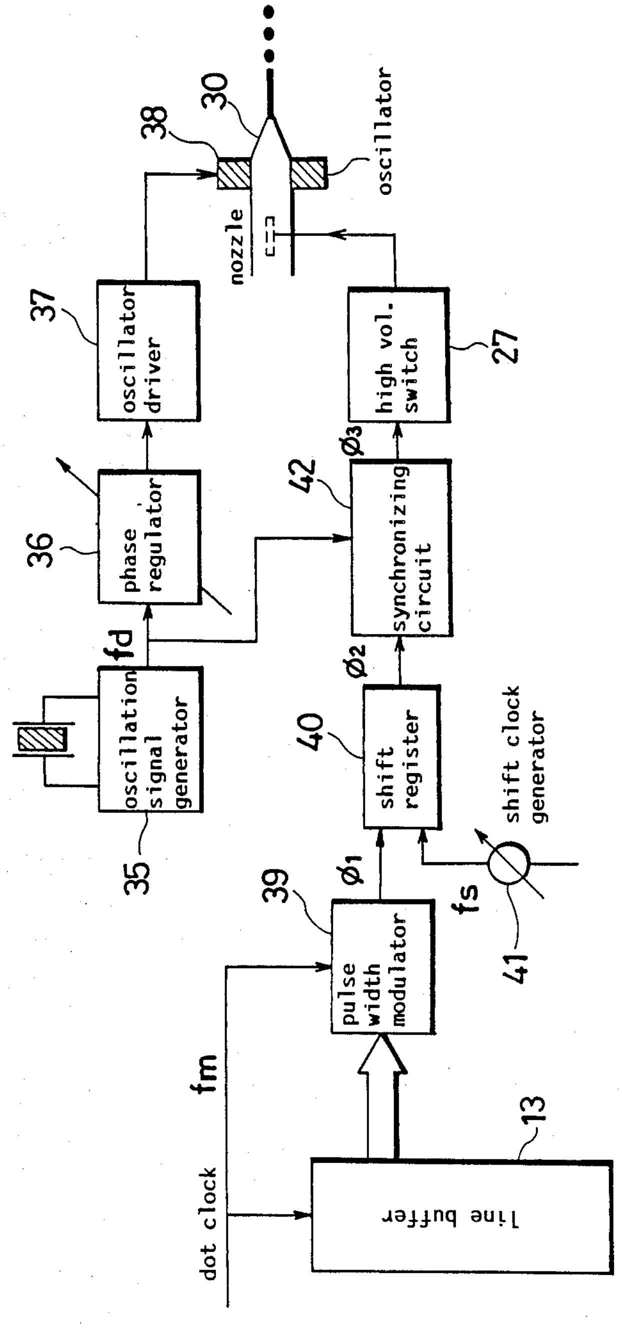
FIG. 6 is a block diagram showing a principal portion of the video printer of FIG. 5.

FIG. 6 shows one example of main circuit 28 according to the present invention, which is provided for each of the nozzles. The circuit 28 comprises an oscillation signal generator 35, a phase regulator 36, an oscillator driver 37, an oscillator 38 mounted on the nozzle 30, a pulsewidth modulator 39, a shift register 40, a shift clock generator 41 and a phase synchronizing circuit 42.

The output of the oscillation signal generator 35 is delivered via the phase regulator 36 to the oscillator driver 37 to be amplified for application to the oscillator 38. As a result, the nozzle 30 is oscillated with a frequency corresponding to the output frequency fd of the oscillation signal generator 35, whereby the ink ejected from the nozzle 30 is broken up into uniform size droplets with a frequency synchronized with the frequency fd. The frequency fd is set to a vicinity of a spontaneous drop formation frequency determined by the properties, droplet size and flow rate of the ink. In this embodiment the frequency fd is set to about 1 MHz.

Figure 3:
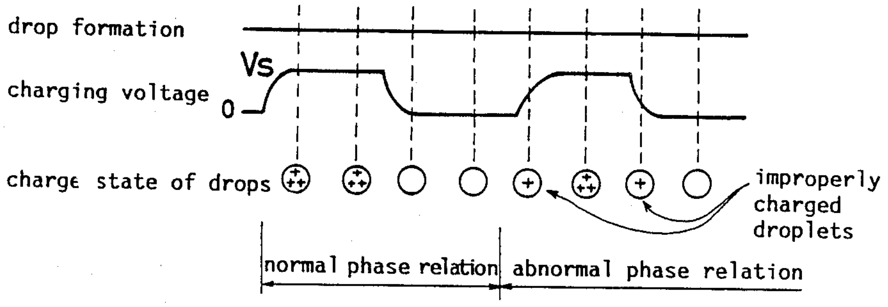
FIG. 3 is a view showing a relationship between a drop formation timing and charging voltage phase.

The phase regulator 36 comprises a circuit for effecting a further fine adjustment by one cycle of the frequency fd on the phases of the drop formation and charging which have been brought substantially into phase by the phase synchronizing circuit 42, thereby to preclude improper charging as described with reference to FIG. 3. The phase regulator 36 may be constituted from a commercially available delay line, for example. A similar effect may be reduced by replacing the phase regulator 36 with a variable delay circuit interposed between the phase synchronizing circuit 42 and the high voltage switch 27.

The pulsewidth modulator 39 receives data corresponding to a dot size from the line buffer 13. The pulsewidth modulator 39 converts the data into a rectangular wave $\phi 1$ of negative polarity that is proportional to the dot size. The data readout from the line buffer 13 and a start (rise) of the pulse-width modulator 39 are controlled by a dot clock fm. The clock fm in this embodiment comprises an output signal of the shaft encoder 26 noted hereinbefore. However, the clock fm may be formed by appropriately dividing the output of the oscillation signal generator 35. In the latter case, it is necessary to employ the digital servo system for the drum rotation wherein the drum is rotated in response to a command signal divided from the frequency fd and in synchronism therewith. The pulsewidth modulator 39 may comprise a preset decrementing counter, or a serial-in parallel-out shift register and a data selector as described in U.S. Pat. application Ser. No. 780,821 noted hereinbefore.

Figure 4:
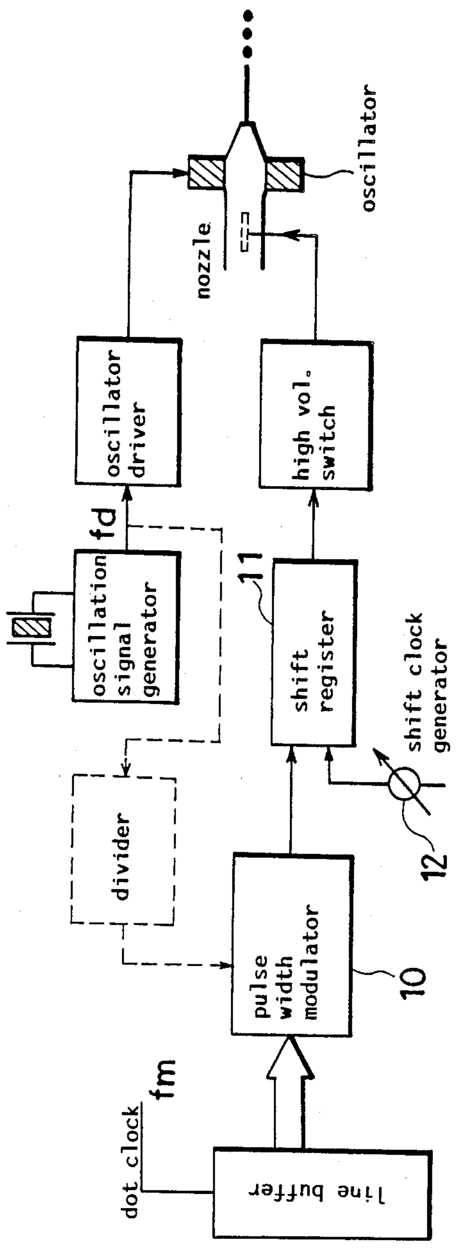
FIG. 4 is a block diagram showing a circuit construction as one example of means for eliminating dot position displacement.

The shift register 40 and the frequency variable shift clock generator 41 act to delay the output of the pulsewidth modulator 39 by a predetermined time. The shift register 40 and the shift clock generator 41 may have the same constructions as described with reference to FIG. 4. The delay time is n/fs where the shift register 40 has n bits and the shift clock has a frequency fs.

In this case, the shift clock generator 41 must have a minimum frequency fs(min) greater than the frequency fd in order that the resolution of the signal does not fall below the drop formation frequency by passing through the shift register 40. Therefore, the adjustable range of delay time Δt is derived from the following equation where fs(max) is a maximum frequency of the clock pulse generator 41:

$$\Delta t = \frac{n}{fs(\min)} - \frac{n}{fs(\max)}$$

Figure 8:
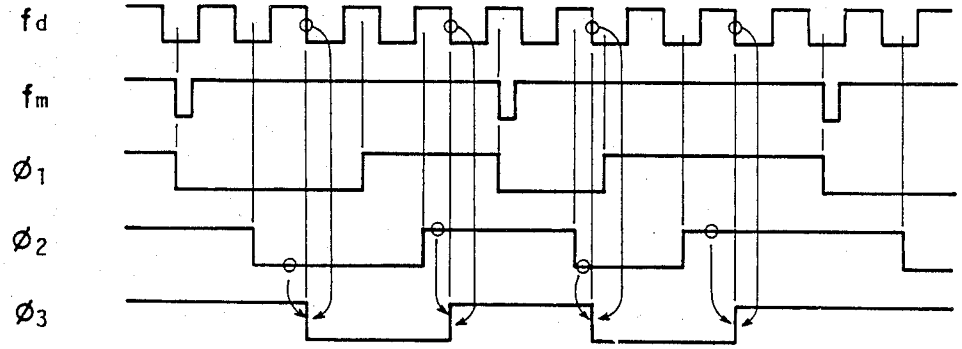
FIG. 8 is a diagram showing the waveforms of parts constituting the circuit shown in FIG. 7.

The signal $\phi 2$ delayed by the shift register 40 is converted by the phase synchronizing circuit 42 into a signal $\phi 3$ that rises and falls in synchronism with falls of the frequency fd as shown in FIG. 8. The signal $\phi 3$ is given to the high voltage switch 27 and acts as charging signal to modulate the ink.

The improper charging is avoided since the charging signal $\phi 3$ is brought into phase with the droplet formation by the phase synchronizing circuit 42. Further, this signal, in combination with the oscillator 30 provided for stabilizing the drop formation, is capable of controlling the ink to a droplet. This is effective to improve the tone reproducibility of highlight portions to the limit of the Hertz's ink jet printer. Moreover, the above charging signal for one nozzle can be delayed with respect to the charging signal for another by varying the bit number of the shift register 40, thereby to prevent the dot position displacement among the nozzles and to enable high fidelity image recording.

Figure 7:
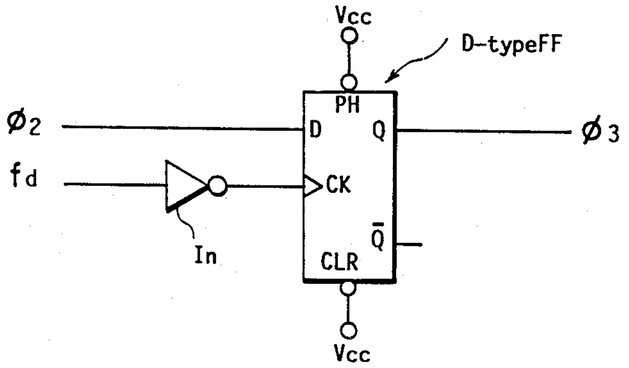
FIG. 7 is a view showing one example of phase synchronizing circuit.

The phase synchronizing circuit 42 may be realized from a delay type flip-flop circuit as shown in FIG. 7. Reference In in FIG. 7 represents an inverter.

The pulse from the shift register 40 is input to an input terminal D of the flip-flop circuit. Its output is delivered from an output terminal Q to the high voltage switch 27. At this time a reference clock fd is input to a terminal CK of the flip-flop, and each time the reference clock is input the output terminal Q outputs a pulse synchronized in phase with the oscillation of the nozzle.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An ink jet printer in which a plurality of ink jet generators are moved in unison with one another and relative to a recording medium for recording, each of said ink jet generators comprising:

an ejecting means for continuously ejecting an ink from a nozzle;

a voltage applying means for applying a pulse voltage to the ink to selectively charge ink droplets;

a means for producing a deflection electric field for deflecting a row of charged droplets and permitting a row of droplets to proceed straight;

a means for generating reference clock pulses;

a nozzle oscillating means responsive to said reference clock pulses for controlling ink droplet formation;

a means for generating dot clock pulses in synchronism with movement of the recording medium;

a pulsewidth controlling means responsive to said dot clock pulses for controlling a pulsewidth of the pulse voltage applied by said voltage applying means according to a dot size to be recorded;

a delaying means for delaying a pulse output from said pulsewidth controlling means, said delaying means being capable of adjusting a delay time of each jet ink generator independently of the other ink jet generators; and a synchronizing means responsive to said reference clock pulses for outputting the pulse output of said delaying means to said voltage applying means.

2. An ink jet printer as claimed in claim 1, further comprising a fine adjustment means for finely adjusting a phase of the ink droplet formation so as to agree with a phase of the pulse voltage to be applied to the ink.

3. An ink jet printer as claimed in claim 1, wherein said synchronizing means comprises a latch having a clock terminal for receiving said reference clock pulses.

4. An ink jet printer as claimed in claim 2, wherein said fine adjustment means is disposed between said means for generating the reference clock pulses and said nozzle oscillating means.

5. An ink jet as claimed in claim 1, wherein said delaying means includes a shift clock generator providing a variable frequency, and a shift clock register for outputting pulses from said pulsewidth controlling means after a delay of time according to the frequency of a shift clock generated by said shift.

* * * * *